Oct. 5, 1937.   C. A. SABBAH   2,094,819
ELECTRIC VALVE CONVERTING SYSTEM
Filed July 8, 1936
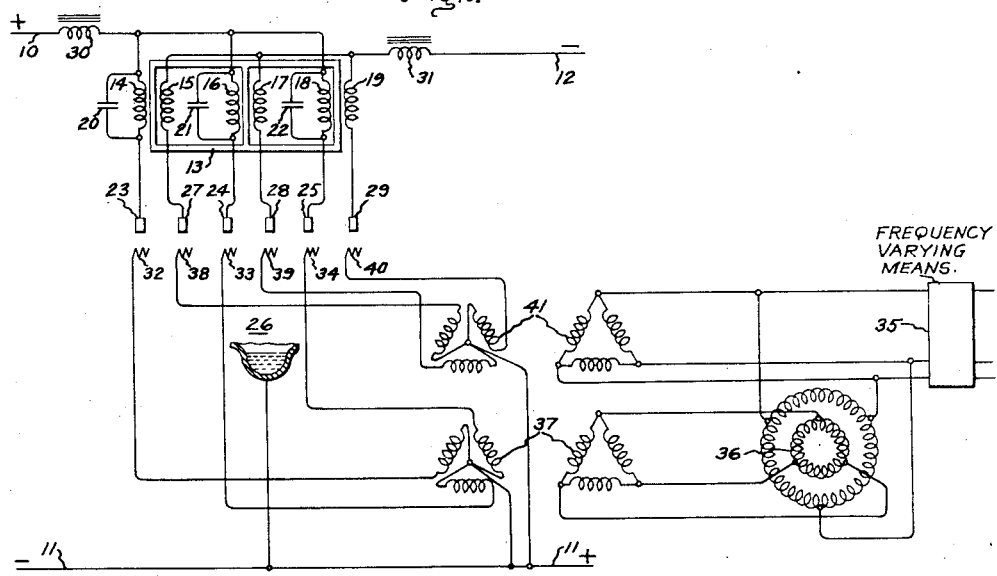
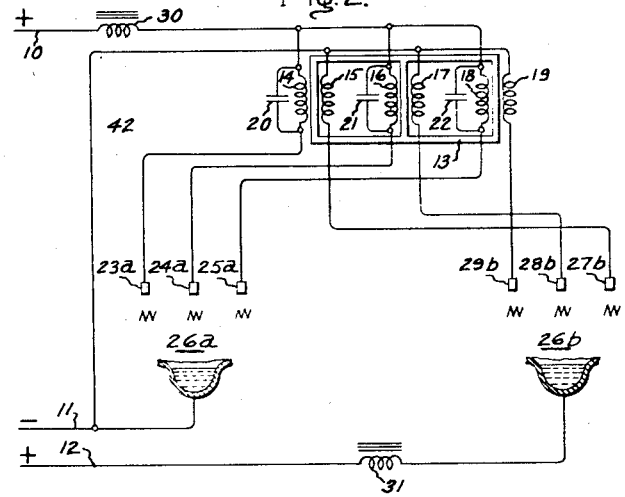
Inventor:
Camil A. Sabbah, Deceased
by William A. Dodge, Administrator
by Harry E. Dunham
Attorney.

Patented Oct. 5, 1937

2,094,819

UNITED STATES PATENT OFFICE 2,094,819

ELECTRIC VALVE CONVERTING SYSTEM

Camil A. Sabbah, deceased, late of Schenectady, N. Y., by William A. Dodge, administrator, Schenectady, N. Y., assignor to General Electric Company, a corporation of New York Application July 8, 1936, Serial No. 89,591

8 Claims. (Cl. 171—97)

This invention relates to electric valve converting systems and more particularly to such systems suitable for transmitting energy from one direct current circuit to another.

An electric valve converting system suitable for transferring energy between two direct current circuits is disclosed in United States Letters Patent No. 1,961,080, granted May 29, 1934, upon the application of C. A. Sabbah for improvements in Electric valve converting systems. This system utilizes an energy storage and transfer device comprising a multi-legged reactor provided with a single inductive winding on each leg thereof and having associated capacitors each connected across at least a portion of said inductive winding to maintain the total magnetomotive force of the core structure and that of each leg thereof substantially constant. A plurality of individual electric discharge valves interconnect the inductive windings of the transfer device to the direct current circuit. The arrangement as disclosed, however, does not readily permit the use of multi-anode, single-cathode electric discharge devices in lieu of individual devices.

It is an object of this invention to provide an improved electric valve converting system for transmitting energy between two direct current circuits which will overcome certain limitations of the arrangements of the prior art, and which will be simple and reliable in operation.

It is a further object of this invention to provide an improved electric valve converting system for transmitting energy between direct current circuits in which electric discharge valves of the multi-anode single-cathode type may be utilized.

It is a still further object of this invention to provide an improved electric valve converting system for transmitting energy between direct current circuits in which the amount of energy transferred is controlled by controlling the frequency of conductivity of the valve means employed therein.

The novel features which are believed to be characteristic of this invention are set forth with particularity in the appended claims. The invention itself, however, both as to its organization and method of operation, together with further objects and advantages thereof, will be better understood by reference to the following description taken in connection with the accompanying drawing in which Fig. 1 represents one embodiment of this invention utilizing a single multi-anode electric discharge device, and Fig. 2 is another modification of this invention utilizing two multi-anode electric discharge valves.

Referring now more particularly to Fig. 1 of the drawing, there is illustrated an electric valve converting system for transferring energy between a constant potential direct current circuit 10, 11, and a constant current direct current circuit 11, 12, said circuits having a common terminal 11. This system is provided with an energy storage and transfer device comprising a three-legged magnetic core structure 13 having a pair of inductive windings 14, 15; 16, 17; 18, 19 on each leg thereof, each pair of inductive windings being provided with energy storage devices which may be in the form of capacitors 20, 21, and 22. These capacitors 20, 21, and 22 are connected in parallel with the inductive windings 14, 16, and 18, respectively, or at least across portions thereof so as to form energy storage circuits. One terminal of each of the windings 14, 16, and 18 is connected to one side of the direct current circuit 10, 11 and the other terminal of each of these windings is connected to the respective anodes 23, 24, and 25 of the multi-anode electric discharge device 26, the cathode of which is connected to the conductor 11. One terminal of each of the windings 15, 17, and 19 is connected to one of the conductors of the direct current circuit 11, 12 and the other terminal of each of these windings is connected to the respective anodes 27, 28, 29 of the multi-anode electric discharge device 26. In order to prevent any interaction between the electric valve converting apparatus and the direct current circuit, smoothing inductors or reactors 30 and 31 may be connected between the apparatus and the direct current circuits. The control electrodes 32, 33, and 34 associated with the anodes 23, 24, and 25 of the discharge valve 26 are energized by current derived from a suitable source of alternating potential 35, the frequency of which may be varied. Alternating energy from the source 35 is controlled by means of a phase shifting device 36, the output of which is connected to the primary winding of a three-phase transformer 37 the secondary windings of which forms part of the circuits interconnecting the grids 32, 33, and 34 with the cathode of the discharge device 26. Alternating current energy from the source 35 is applied to the grids 38, 39, and 40, which are associated with the anodes 27, 28, and 29, by means of a three-phase transformer 41, the secondary windings of which form part of the circuits interconnecting these grids with the cathode of the discharge device 26. It will be apparent to those skilled in the art that each of the grid-to-cathode circuits of the discharge device 26 may be provided with grid current limiting resistors as is common practice in the art.

In operation, neglecting the leakage reactance between windings common to each leg of the device 13, the windings and capacitors associated with the core structure thereof serve to maintain the total magnetomotive force and that of each of the legs of the magnetic core at a substantially constant value. Each of the anode-to-cathode discharge paths of the electric valve 26 is conductive for 120 electrical degrees of each cycle, these paths becoming conductive in a predetermined sequence at a frequency equal to that of the alternating current source 35, from which the control electrodes or grids are controlled. In order to operate this system properly, the phase relation between the grid excitation of the anode-to-cathode discharge paths of the anodes 23, 24, and 25 and the anodes 27, 28, 29 must be such that the latter group of anodes becomes conductive in advance of the corresponding anode of the other group on each leg of the core structure 13. Thus the angle of advance between two anodes such as 23 and 27 for example, will lie between any value just greater than 0° and slightly less than 180°. The phase shifting device 36 provides the means for obtaining this phase difference and also operates as a control for determining the amount of energy transferred between the two direct current circuits. The voltage relation and the power transfer relation between the two direct current circuits is dependent upon the ratio between the windings of each pair of windings on each leg of the core structure 13; the size of the capacitors connected across the windings 14, 16, and 18; the frequency of the alternating current potential applied upon the control electrodes of the discharge device 26 as derived from the alternating current source 35; and the phase relation between the excitation of the groups of grid electrodes 32, 33, 34 and 38, 39, 40.

The function performed in the operation of the system by the three-legged core structure 13, the windings 14, 16, 18 and the associated capacitors 20, 21, and 22 perhaps will be clarified by the following example of one cycle of operation of the discharge paths of the electric valve 26 associated with one leg of the core structure. If it be assumed, for example, that grid excitation supplied to control electrodes 32, 38 differs by a phase difference of 120°, the discharge path between the anode 27 and the cathode of the device 26 will be conductive for 120 electrical degrees and meanwhile the path between the anode 23 and the cathode of the device 26 will remain in a non-conductive state. In order to supply energy to the anode 27 it must be assumed that the energy storage circuit comprising the inductor 14 and the capacitor 20 has been charged to a certain value which now discharges by induction into the winding 15. At the end of the period of conductivity of the anode 27 the anode 23 becomes conductive for 120 electrical degrees during which time energy is stored in the capacitor 20. At the end of the period of conductivity of the anode 23 the current is commutated from the anode 23 to one of the other anodes 24 or 25. For the next 120 electrical degrees both the anodes 23 and 27 remain non-conductive and the capacitor 20 now discharges into the transformer winding 14 so as to maintain the required magnetomotive force in this leg of the core structure and in so doing it reverses the polarity of the charge upon the capacitor so that it has the proper polarity to supply power to the anode 27 when this anode is again permitted to become conductive. From this it is believed that it will be apparent to those skilled in the art that the capacitors 20, 21, 22 not only provide commutating potentials to cause the transfer of current between the anodes 23, 24, and 25, but together with their associated windings also operate as energy storage devices to supply current to the anodes 27, 28, and 29, during their periods of conductivity. For purposes of explanation the operation of this system has been described as transferring energy from the constant potential direct current circuit 10, 11 to the direct current circuit 11, 12, which has a constant current characteristic, but it will be apparent that the energy transfer may occur in the opposite direction. It furthermore will also be apparent to those skilled in the art that by providing means for varying the frequency source of alternating current 35, the value of the current transferred between the two circuits may be readily controlled.

In the arrangement disclosed in Fig. 2 a pair of multi-anode, single-cathode discharge devices 26a and 26b interconnect the windings on the core structure 13 with the direct current circuits 10, 11, and 11, 12. Since the remaining elements are identical to those elements disclosed in Fig. 1, they have been given like reference characters except that the groups of anodes of the devices 26a and 26b have been given in addition subscripts a and b respectively. The arrangement disclosed in this figure has the advantage of improved operation in the instance where the direct current voltages appearing across the constant current circuit 11, 12 are relatively low compared to the direct current potential appearing across the constant potential circuit 10, 11. Thus the upper extremities of the windings 14, 16, and 18 are connected to the conductor 10 and the lower extremities of these windings are connected respectively to the anodes 23a, 24a, 25a of the discharge device 26a, the cathode of which is connected to the conductor 11. The upper extremities of the windings 15, 17, and 19 are connected by means of a conductor 42 to the conductor 11 and the lower extremities of these windings are connected respectively to the anodes 27b, 28b, and 29b of the discharge device 26b the cathode of which is connected to the conductor 12. The operation of the embodiment of the invention illustrated in Fig. 2 is substantially in accordance with the principles of operation set forth in detail in connection with the description of Fig. 1, and it is, therefore, not believed that any further description is necessary for a complete understanding of this embodiment of the invention.

While this invention has been shown and described in connection with certain specific embodiments it will, of course, be understood that it is not to be limited thereto, since it is apparent that the principles herein disclosed are susceptible of numerous other applications, and modifications may be made in the circuit arrangement and in the instrumentalities employed without departing from the spirit and scope of the invention as set forth in the appended claims.

What is claimed as new and desired to secure by Letters Patent of the United States is:

1. An electric valve converting system for transferring energy between direct current circuits comprising an $n$-legged core structure provided with a pair of windings on each leg thereof, $n$ energy storage devices, said energy storage devices being connected to one winding of said pairs of windings to maintain a substantially constant magnetomotive force in said structure, means including an electric discharge valve provided with $2n$ anodes and a single cathode interconnecting said windings with said circuits and means for controlling the conductivities of said anode cathode discharge paths.

2. An electric valve converting system for transferring energy between direct current circuits comprising an $n$-legged core structure provided with a pair of windings on each leg thereof, one winding of each pair being connected to one of said circuits, the other winding being connected to the other of said circuits, $n$ capacitors connected across the windings associated with one of said circuits, an electric discharge valve provided with 2-$n$ anodes and a cathode, said anodes being connected to said windings and said cathode being connected to both said circuits, and means for controlling the discharge paths between said anodes and said cathode.

3. An electric valve converting system for transferring energy between direct current circuits comprising an $n$-legged core structure having a pair of windings on each leg, $n$ energy storage devices each associated with one of the windings on each leg, means including an electric discharge valve means of the multi-anode type for interconnecting one of the windings on each leg with one of said circuits and the remaining windings with the other of said circuits, and means for controlling the sequence and the frequency of the conductivities of said valves.

4. An electric valve converting system for transferring energy between direct currents comprising an $n$-legged core structure provided with a pair of windings on each leg thereof, $n$ capacitors each connected across one winding of said pairs of windings, means including electric discharge valve means of the multi-anode type for interconnecting said windings with said circuits, a common connection between said circuits, means connecting all of said windings having capacitors connected thereto to one of said circuits, means connecting the remaining windings to the other of said circuits, and means for controlling the conductivities of said anodes.

5. An electric valve converting system for transferring energy between constant potential and constant current direct currents comprising an $n$-legged core structure provided with a pair of windings on each leg thereof, $n$ capacitors each connected across one winding on each leg, electric discharge valve means of the multi-anode type, means including said valve means for interconnecting said windings provided with capacitors with said constant potential circuit, means including said valve means for interconnecting the remaining windings with said constant current circuit, means for controlling the conductivities of said anodes, and means for shifting instants of conductivity of the anodes associated with one of said circuits to control the transfer of energy between said circuits.

6. An electric valve converting system for transmitting energy between direct current circuits, one of which has a constant current characteristic comprising an $n$-legged core structure provided with two windings on each leg thereof, a capacitor for each leg, each capacitor being connected to one of said windings to maintain a substantially constant magnetomotive force in said structure, electric discharge valve means of the single cathode multi-anode type having an anode connected to each winding, one winding on each leg being connected to one of said circuits, the other winding being connected to the other of said circuits, means for controlling the sequence of the conductivities of said valve means, and means for shifting the moment of ignition of each of the anodes connected to windings associated with one of said circuits to control the transfer of energy between said circuits.

7. A system for transmitting energy between a constant potential direct current circuit and a constant current circuit comprising a polyphase core structure having two groups of inductive windings, means including a multi-anode electric discharge valve interconnecting one group of windings with said constant potential circuit, a capacitor for each winding of said group for maintaining a substantially constant magnetomotive force in said structure, means including a second multi-anode electric discharge valve interconnecting the other group of windings with said constant current circuit, and means for controlling the conductivity of said valves.

8. An electric valve converting system for transferring energy between constant potential and constant current direct current circuits comprising an $n$-legged core structure provided with a pair of windings on each leg thereof, $n$ capacitors each connected across one winding on each leg, electric discharge valve means of the multi-anode type, means including said valve means for interconnecting said windings provided with capacitors with said constant potential circuit, means including said valve means for interconnecting the remaining windings with said constant current circuit, means for controlling the conductivities of said anodes, and means for controlling the frequency of the conductivities of said anodes to control the transferred energy between said circuit.

WILLIAM A. DODGE,
Administrator of the Estate of Camil A. Sabbah, Deceased.